(12) United States Patent
Shu-Zhong Cabos et al.

(10) Patent No.: US 11,495,062 B2
(45) Date of Patent: Nov. 8, 2022

(54) SEAT COMPONENT FAULT DETERMINATION AND PREDICTION

(71) Applicant: THE BOEING COMPANY, Chicago, IL (US)

(72) Inventors: Ralf Rene Shu-Zhong Cabos, Hainburg (DE); Nils Kneuper, Bergkamen (DE); Andre Lutz, Erzhausen (DE)

(73) Assignee: THE BOEING COMPANY, Chicago, IL (US)

( * ) Notice: Subject to any disclaimer, the term of this patent is extended or adjusted under 35 U.S.C. 154(b) by 162 days.

(21) Appl. No.: 16/373,462

(22) Filed: Apr. 2, 2019

(65) Prior Publication Data

US 2020/0320801 A1 Oct. 8, 2020

(51) Int. Cl.
*G07C 5/08* (2006.01)
*B64F 5/60* (2017.01)
*G07C 5/00* (2006.01)

(52) U.S. Cl.
CPC .............. *G07C 5/0808* (2013.01); *B64F 5/60* (2017.01); *G07C 5/006* (2013.01); *G07C 5/0825* (2013.01); *G07C 5/0841* (2013.01)

(58) Field of Classification Search
CPC ......... B64F 5/60; G07C 5/006; G07C 5/0825; G07C 5/0841
See application file for complete search history.

(56) References Cited

U.S. PATENT DOCUMENTS

| | | | |
|---|---|---|---|
| 6,934,137 B2* | 8/2005 | Elliott | B64D 11/0624 361/62 |
| 10,214,118 B1* | 2/2019 | Jain | B60K 35/00 |
| 10,708,630 B1* | 7/2020 | Pham | H04N 21/2146 |
| 2004/0031882 A1* | 2/2004 | Wagner | B60N 2/242 244/118.6 |
| 2008/0129112 A1* | 6/2008 | Mills | B64D 11/0015 307/9.1 |
| 2010/0152962 A1* | 6/2010 | Bennett | G07C 5/0808 701/31.4 |
| 2014/0172242 A1* | 6/2014 | Fruhwald | B64D 11/0015 701/49 |
| 2018/0319503 A1* | 11/2018 | Sidambarom | B60N 2/0244 |
| 2019/0054873 A1* | 2/2019 | Liongosari | B60W 40/09 |
| 2020/0070772 A1* | 3/2020 | Kim | B60Q 9/00 |
| 2020/0086993 A1* | 3/2020 | Phan | B64D 11/00155 |
| 2020/0226434 A1* | 7/2020 | Li | G06K 9/62 |
| 2020/0269995 A1* | 8/2020 | Beaven | G07C 5/008 |

* cited by examiner

*Primary Examiner* — James J Lee
*Assistant Examiner* — Wenyuan Yang
(74) *Attorney, Agent, or Firm* — Patterson + Sheridan, LLP

(57) ABSTRACT

Certain aspects of the present disclosure provide a method that includes: collecting seat sensor data associated with a plurality of seats in a vehicle; selecting a first subset of data from the collected seat sensor data; providing the first subset of data to a fault detection model; receiving, from the fault detection model, one or more detected seat component faults; and generating, based on the one or more detected seat component faults, a seat condition map associated with the vehicle.

31 Claims, 9 Drawing Sheets

200 ↴

| | | Sensors | | | | | | | | | |
|---|---|---|---|---|---|---|---|---|---|---|---|
| Faults | Armrest Strain Sensor | Armrest Recline Button Sensor | Armrest Angle Sensor | Seat Cushion Force Sensor | Seat Cushion Accelerometer | Backrest Strain Sensor | Backrest Accelerometer | Tray Table Angle Sensor | Tray Table Torque Sensor | Seat Joint Angle Sensor | Seat Joint Torque Sensor |
| 220 | 201 | 203 | 205 | 207 | 209 | 211 | 213 | 215 | 217 | 219 | 221 |
| 202 — Backrest Fault | X | | | | | X | | | | X | |
| 204 — Seat Joint Fault | | | | | | | X | | | X | X |
| 206 — Seat Cushion Fault | | | | X | X | | | | | | |
| 208 — Recline Button Fault | | X | | | | | | | | X | X |
| 210 — Armrest Fault | X | | X | | | | | | | | |
| 212 — Tray Table Fault | | | | | | | | X | X | | |

| Faults 220 | Armrest Strain Sensor 201 | Armrest Recline Button Sensor 203 | Armrest Angle Sensor 205 | Seat Cushion Force Sensor 207 | Seat Cushion Accelerometer 209 | Backrest Strain Sensor 211 | Backrest Accelerometer 213 | Tray Table Angle Sensor 215 | Tray Table Torque Sensor 217 | Seat Joint Angle Sensor 219 | Seat Joint Torque Sensor 221 |
|---|---|---|---|---|---|---|---|---|---|---|---|
| Backrest Fault 202 |  | X |  |  |  | X |  |  |  | X |  |
| Seat Joint Fault 204 |  |  |  |  |  |  | X |  |  | X | X |
| Seat Cushion Fault 206 |  | X |  | X | X |  |  |  |  |  |  |
| Recline Button Fault 208 |  | X |  |  |  |  |  |  |  |  |  |
| Armrest Fault 210 | X |  | X |  |  |  |  |  |  | X | X |
| Tray Table Fault 212 |  |  |  |  |  |  |  | X | X |  |  |

FIG. 2

SEAT COMPONENT FAULT DETERMINATION AND PREDICTION

INTRODUCTION

Aspects of the present disclosure relate to detecting and predicting faults in commercial vehicle parts, and in particular, to detecting and predicting different fault modes for seats in commercial travel vehicles, such as aircraft.

BRIEF SUMMARY

In a first embodiment, a method, includes: collecting seat sensor data associated with a plurality of seats in a vehicle, wherein each seat sensor datum in the seat sensor data is associated with: an individual seat of the plurality of seats, and an individual sensor associated with the individual seat; selecting a first subset of data from the collected seat sensor data; providing the first subset of data to a fault detection model; and receiving, from the fault detection model, one or more detected seat component faults, wherein each of the one or more detected seat component faults is associated with an individual seat of the plurality of seats in the vehicle.

In some examples, the method further includes: storing in a training data repository: the one or more detected seat component faults; and a subset of the collected seat sensor data associated with the one or more detected seat component faults.

In some examples, the method further includes: training, based on the one or more detected seat component faults and the subset of the collected seat sensor data associated with the one or more detected seat component faults, a fault prediction model; selecting a second subset of data from the collected seat sensor data; providing the second subset of data to the fault prediction model; and receiving, from the fault prediction model, one or more predicted seat component faults, wherein each of the one or more predicted seat component faults is associated with an individual seat of the plurality of seats in the vehicle.

In some examples, the second subset of data excludes the collected seat sensor data associated with the one or more detected seat component faults.

In some examples, the method further includes: aligning in time a plurality of data streams in the first subset of data prior to providing the first subset of data to the fault detection model, wherein each data stream of the plurality of data streams is associated with a different type of seat sensor.

In some examples, the method further includes: generating, based on the one or more detected seat component faults, a seat condition map associated with the vehicle, wherein the seat condition map comprises a seat condition indication for each seat of the plurality of seats in the vehicle; and displaying in a graphical user interface on an electronic device: the seat condition map; and one or more user interface elements related to the detected seat component faults.

In some examples, the method further includes: generating an alert based on the one or more detected seat component faults.

In some examples, the method further includes: providing the alert to at least one of a vehicle ticketing system or a vehicle maintenance system.

In a second embodiment, an apparatus includes: a memory comprising computer-executable instructions; a processor configured to execute the computer-executable instructions and cause the apparatus to: collect seat sensor data associated with a plurality of seats in a vehicle, wherein each seat sensor datum in the seat sensor data is associated with: an individual seat of the plurality of seats, and an individual sensor associated with the individual seat; select a first subset of data from the collected seat sensor data; provide the first subset of data to a fault detection model; and receive, from the fault detection model, one or more detected seat component faults, wherein each of the one or more detected seat component faults is associated with an individual seat of the plurality of seats in the vehicle.

In some examples, the processor is further configured to cause the apparatus to: store in a training data repository: the one or more detected seat component faults; and a subset of the collected seat sensor data associated with the one or more detected seat component faults.

In some examples, the processor is further configured to cause the apparatus to: train, based on the one or more detected seat component faults and the subset of the collected seat sensor data associated with the one or more detected seat component faults, a fault prediction model; select a second subset of data from the collected seat sensor data; provide the second subset of data to the fault prediction model; and receive, from the fault prediction model, one or more predicted seat component faults, wherein each of the one or more predicted seat component faults is associated with an individual seat of the plurality of seats in the vehicle.

In some examples, the second subset of data excludes the collected seat sensor data associated with the one or more detected seat component faults.

In some examples, the processor is further configured to cause the apparatus to: align in time a plurality of data streams in the first subset of data prior to providing the first subset of data to the fault detection model, wherein each data stream of the plurality of data streams is associated with a different type of seat sensor.

In some examples, the processor is further configured to cause the apparatus to: generate, based on the one or more detected seat component faults, a seat condition map associated with the vehicle, wherein the seat condition map comprises a seat condition indication for each seat of the plurality of seats in the vehicle; and display in a graphical user interface: the seat condition map; and one or more user interface elements related to the detected seat component faults.

In some examples, the processor is further configured to cause the apparatus to: generate an alert based on the one or more detected seat component faults.

In some examples, the processor is further configured to cause the apparatus to: provide the alert to at least one of a vehicle ticketing system or a vehicle maintenance system.

In a third embodiment, a system includes: a plurality of seat blocks, wherein: each respective seat block of the plurality of seat blocks comprises a plurality of seats and a minicomputer, and each seat of the plurality of seats in the respective seat block comprises a plurality of seat sensors in data communication with the minicomputer; a display device; a memory comprising computer-executable instructions; a processor configured to execute the computer-executable instructions and cause the apparatus to: receive seat sensor data from each respective seat block of the plurality of seat blocks via the respective seat block's minicomputer; provide the seat sensor data to a fault detection model; receive, from the fault detection model, one or more detected seat component faults; and display, on the display device, a seat condition map comprising an indication associated with each of the one or more detected seat component faults.

In some examples, the system further includes: a transceiver, wherein the processor is further configured to cause the apparatus to: transmit, via the transceiver, the one or more detected seat component faults to at least one of: a vehicle maintenance system; or a vehicle ticketing system.

In some examples, the display device, memory, processor, and transceiver are part of a vehicle cabin information system.

In some examples, the plurality of seat blocks and the vehicle cabin information system are installed in an aircraft.

In a fourth embodiment, a method, includes: receiving, from a seat condition system, an alert comprising an indication of at least one of: a detected seat component fault associated with a seat in a vehicle; or a predicted seat component fault associated with the seat in the vehicle; and scheduling maintenance of the vehicle based on the alert, wherein the alert is based on data from one or more seat sensors in the seat in the vehicle.

In some examples, the alert was generated based on output of a model of the seat condition system.

In some examples, the vehicle is an aircraft.

In a fifth embodiment, a method, includes: collecting seat sensor data associated with a plurality of seats in a vehicle, wherein each seat sensor datum in the seat sensor data is associated with: an individual seat of the plurality of seats, and an individual sensor associated with the individual seat; providing the seat sensor data to a fault prediction model; and receiving, from the fault prediction model, one or more predicted seat component faults, wherein each of the one or more predicted seat component faults is associated with an individual seat of the plurality of seats in the vehicle.

In some examples, the method further includes: receiving, from a training data repository, training data comprising: one or more seat component faults; and seat sensor data associated with the one or more seat component faults; and training, based on the one or more seat component faults and the seat sensor data associated with the one or more seat component faults, the fault prediction model.

In some examples, the method further includes: generating, based on the one or more predicted seat component faults, a seat condition map associated with the vehicle, wherein the seat condition map comprises a seat condition indication for each seat of the plurality of seats in the vehicle.

In some examples, the method further includes: generating an alert based on the one or more detected predicted component faults; and providing the alert to at least one of a vehicle ticketing system or a vehicle maintenance system.

In a sixth embodiment, an apparatus includes: a memory comprising computer-executable instructions; a processor configured to execute the computer-executable instructions and cause the apparatus to: collect seat sensor data associated with a plurality of seats in a vehicle, wherein each seat sensor datum in the seat sensor data is associated with: an individual seat of the plurality of seats, and an individual sensor associated with the individual seat; provide the seat sensor data to a fault prediction model; and receive, from the fault prediction model, one or more predicted seat component faults, wherein each of the one or more predicted seat component faults is associated with an individual seat of the plurality of seats in the vehicle.

In some examples, the processor is further configured to cause the apparatus to: receive, from a training data repository, training data comprising: one or more seat component faults; and seat sensor data associated with the one or more seat component faults; and train, based on the one or more seat component faults and the seat sensor data associated with the one or more seat component faults, the fault prediction model.

In some examples, the processor is further configured to cause the apparatus to: generate, based on the one or more predicted seat component faults, a seat condition map associated with the vehicle, wherein the seat condition map comprises a seat condition indication for each seat of the plurality of seats in the vehicle.

In some examples, the processor is further configured to cause the apparatus to: generate an alert based on the one or more detected predicted component faults; and provide the alert to at least one of a vehicle ticketing system or a vehicle maintenance system.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 2 depicts an example of mapping of specific sensors to specific fault modes.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
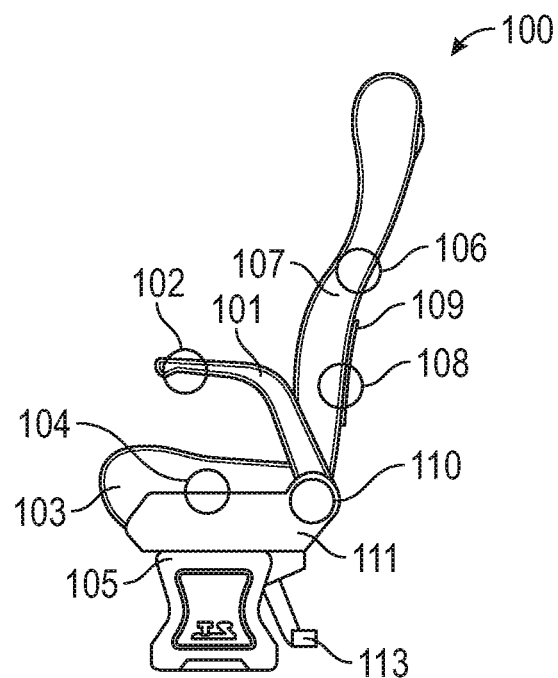
FIG. 1A depicts an example commercial vehicle seat with a plurality of integrated sensors.

Aspects of the present disclosure provide apparatuses, methods, processing systems, and computer readable mediums for detecting and predicting specific fault modes for seats in commercial travel vehicles.

Conventional commercial vehicle seats do not have sensors, or at best very basic sensors, which have limited the ability to detect the current condition of the seat and to predict the future condition of the seat reliably. Historically, determining a condition of a commercial vehicle seat has required visual inspection and manual reports of faults, by which time a passenger has usually had a negative experience (e.g., by sitting in a broken seat) and/or the proprietor has had a negative experience (e.g., by not being able to sell travel in a seat not in condition for use).

In some cases, simplistic prediction models have been used to predict seat maintenance issues, such as models predicting a fault in a seat every certain number of hours of use of the commercial vehicle. For example, an aircraft seat may be predicted to experience a fault of some sort and thus require repair or replacement every 10,000 flight hours. Such models tend to have limited predictive value, however, because they do not consider aspects of the actual use of each individual seat, which may significantly affect the individual seat's expected service life. In other words, such models assume, for example, that all seats are used exactly the same amount and in exactly the same ways over all their flight hours. Moreover, such models tend to focus only on the occurrence of any fault of the seat, not specific faults of the seat, such as faults in specific components of the seat. Accordingly, such models are not generally usable for providing improved maintenance schemes, load balancing, and the like.

In recent years, sensor technology has evolved rapidly such that sensors of all sorts are being used in an increasingly wide array of applications. For example, sensors are getting smaller, getting less expensive, and requiring less power, all while becoming more capable due to advancements in packaging, miniaturization of components, and increased communication capabilities.

By integrating various sensors into commercial vehicle seats, it is possible to provide significantly more accurate condition determinations, as well as to develop significantly better predictive models regarding future wear, faults, and maintenance or replacement needs. Thus, the time consuming and inaccurate process of manual inspection can be replaced by collection of sensor data that is automatically analyzed to make current condition determinations and future condition determinations.

The integration of sensors into commercial vehicle seats is even more convenient with the increased digitalization of the commercial vehicles themselves. For example, commercial vehicles increasingly include widely distributed power access points, wired and wireless data networks, on-board computing equipment, data storage, and the ability to share data among computing resources, including remote computing resources. For example, modern aircraft may include a variety of digital systems that provide power and data throughout the cabin to provide services to passengers as well as to collect data, such as ambient condition sensor data.

Described herein are systems and methods for implementing a variety of sensors in commercial vehicle seats and for determining current statuses and predicting future statuses of the commercial vehicle seats based on data collected from the sensors. In particular, such methods and systems provide the ability to detect seat component faults and to predict future component faults, where seat components include things such as the seat cushion, seat back, armrest, tray table, recline or other articulation buttons, joints between various seat components, and the like. Such methods and systems enable enhanced usage and maintenance schemes for commercial vehicle seats, as described in more detail below.

Example Integration of Sensors into a Commercial Vehicle Seat

FIG. 1A depicts an example commercial vehicle seat 100 with a plurality of integrated sensors. For example, seat 100 may be found in a commercial travel vehicle, such as an aircraft, a watercraft, a bus, a train, or another commercial vehicle for moving passengers from place to place.

In this example, seat 100 includes armrest sensors 102, seat cushion sensors 104, backrest sensors 106, tray table sensors 108, and seat joint sensors 110.

In this example, armrest sensors 102 include a recline button sensor configured to sense when the recline button is depressed. Further, armrest sensors 102 includes a strain sensor (or gauge) configured to measure strain on armrest 101, such as when a passenger rests an arm on, leans on, or pulls against armrest 101.

Here, strain is used to describe a measurement of the deformation of a component, such as the armrest. The material of a certain component or object can be deformed by axial strain, such as elongation (e.g., stretch or traction) or contraction (e.g., compression), or by bending, which may cause elongation on one side of a component and contraction on another side of the component. A component may experience strain due to several factors, such as the effect of an applied external force (mechanical strain), the influence of heat and cold (thermal strain), and even internal forces from the non-uniform cooling of cast components, forging, or welding (residual strain).

Strain may be measured periodically to determine the level of stress on the material over time. Generally, the value and direction of the mechanical stress is determined from the measured strain and known properties of the material (e.g., a modulus of elasticity and Poisson's ratio). Commonly used instruments to measure strain are electrical strain sensors and fiber optic strain sensors. Electrical strain sensors include, for example, metallic wire-type strain sensors, semiconductor strain sensors, diffused semiconductor strain sensors, thin-film strain sensors, bonded resistance strain sensors, load cells, and others.

Seat 100 also includes seat cushion sensors 104, which in this example include a seat cushion force sensor and a seat cushion acceleration sensor.

A force sensor (or gauge) is configured to measure the mechanical force applied to a component, such as the force of a passenger sitting on the seat cushion 104 of seat 100. Force sensors are often digital sensors that include a load cell or a piezoelectric crystal that converts physical forces into electronic data signals.

An acceleration sensor (or accelerometer) is configured to measure the acceleration experienced by a component, such as the acceleration of seat cushion 104 (or seat portion 111 of seat 100). For example, accelerations may occur when a passenger drops into seat 103 (which would also register as a force), as well as when, for example, a vehicle in which seat 100 is installed (e.g., an aircraft) is maneuvering or experiencing turbulence.

Acceleration sensors come in many forms, including AC-response or DC-response type sensors. AC-response acceleration sensors may include, for example, charge mode piezoelectric sensors, voltage mode piezoelectric sensors. DC-response acceleration sensors may include, for example, capacity sensors and piezoresistive sensors.

Seat 100 also includes backrest sensors 106, which in this example include a backrest strain sensor and a backrest acceleration sensor. For example, the backrest strain sensor may be configured to measure strain on backrest 107, such as when a passenger rests against, pushes against, pulls against, or otherwise strains backrest 107. Similarly, the backrest acceleration sensor may be configured to measure accelerations of backrest 107, which may be caused by a passenger resting against, pushing against, or pulling against backrest 107, as well as movements of the vehicle in which seat 100 is installed (e.g., movements of an aircraft).

Seat 100 also includes tray table sensors 108, which in this example include a tray table angle sensor and a tray table joint torque sensor. The tray table angle sensor is configured to measure an angle of tray table 109, which may indicate, for example, the position of the tray table (e.g., stowed or deployed).

The tray table joint torque sensor is configured to measure the torque (i.e., twist or torsional force) applied to the joint or hinge about which tray table 109 rotates between the stowed and deployed positions. The tray table joint torque sensor may be configured to measure static torque when tray table 109 is in either position, such as when it is deployed and carrying the weight of items placed upon it. The tray table joint torque sensor may also measure dynamic torque, such as rotary or angular force when tray table 109 is being moved between positions. In some implementations, two different torque sensors may be used to measure dynamic and static torque forces.

Seat 100 also includes seat joint sensors 110, which in this example include a backrest angle sensor and a backrest joint (or hinge) torque sensor.

The backrest angle sensor measures the angle of the backrest, for example, relative to a reference plane. Often seats have a range of reclining motion, which may be measured by the backrest angle sensor.

The backrest torque sensor, like the tray table torque sensor, measures torque on the joint (or hinge) between seat portion 111 and backrest 107. As above, the backrest torque sensor may measure static torque, such as the torsional force applied to the hinge by the weight of a passenger in seat 100, and/or dynamic torque, such as the force applied to the hinge as the backrest is reclined or inclined.

Generally, the various sensors integrated into seat 100 may provide data either continually or periodically, such as once per second, or on some other interval. A time series of sensor data may be referred to as a data stream. Because each sensor may provide data at different intervals, it may be necessary to time-align the sensor data later when using it as model input.

In some cases, a sensor may not output any data until a threshold value is crossed, such as a threshold force or torque is exceeded. In such cases, the output of the sensor may be binary (e.g., representing merely that the threshold has been crossed) or continuous (e.g., representing the actual value indicated by the sensor measurement). This may beneficially reduce the overall amount of sensor data collected from the various sensors in seat 100.

The sensors depicted and described with respect to FIG. 1A are just one example implementation, and others are possible. For example, more or fewer sensors of the types described above, or of different types, may be fitted to seat 100. Further, different combinations of sensors than those described above may be fitted to components of seat 100. In some cases, single devices may provide multiple sensing capabilities and therefore multiple sensor data outputs, and thus fewer sensors than described above may be used to capture the same types of sensor data. Further yet, in other implementations, other components of seat 100 may include sensors, such as footrest 113 or seat frame 105, or other components of seat 100 not previously discussed.

Figure 1B:
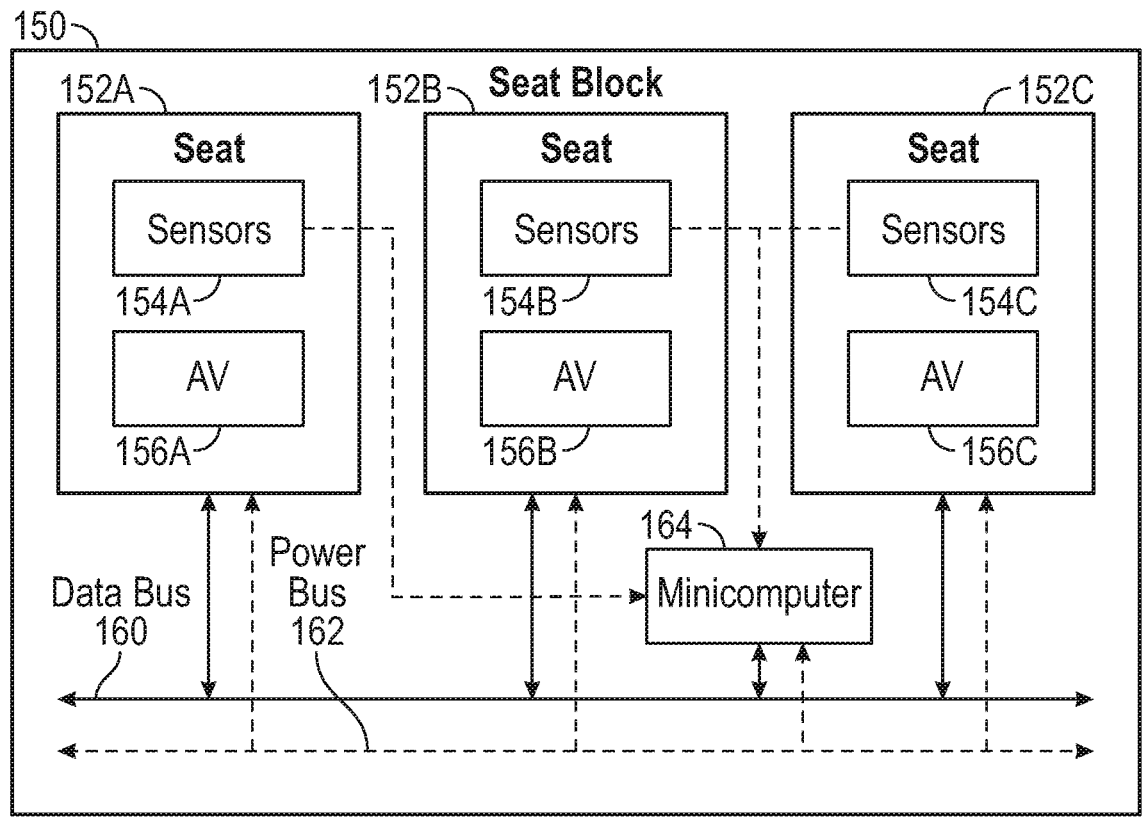
FIG. 1B depicts an example seat block including multiple seats.

FIG. 1B depicts an example seat block 150 including multiple seats, 152A-152C.

In some commercial travel vehicles, such as aircraft, multiple seats are mounted together in integrated units or blocks. For example, an aircraft may have many seat blocks, such as seat block 150, each comprising a plurality of individual seats, such as seat 100 described above with respect to FIG. 1A. Each seat may then have a plurality of individual sensors.

In this example, seat block 150 includes three seats, 152A-C, which each include electrical components, such as sensors (e.g., 154A-C) and audio and/or video equipment (e.g., 156A-C). For example, sensors 154A in seat 152A may be as described above in FIG. 1A.

Each of seats 152A-C may be connected to a common data bus 160 and common power bus 162 provided in the commercial travel vehicle. For example, an aircraft may include power and data connections at each seat block to provide data to and from sensors 154A-C and AV equipment 156A-C.

In some implementations, data to and from sensors 154A-C and AV equipment 156A-C may be alternatively transmitted over a wireless network, such as a wireless data network enabled within the commercial travel vehicle. In some implementations, a mix of wired and wireless data transmission techniques may be used.

In this example, sensors 154A-C are connected to minicomputer 164, which collects sensor data and retransmits it on data bus 160. For example, the sensor data may be retransmitted to another vehicle-based system or to a communication system for retransmission to processing system remote from the vehicle. Minicomputer 164 may alternatively or additionally exchange data via a wireless data network (not shown).

In some implementations, minicomputer 164 may serve to collect data from various sensors (e.g., 154A-C), align the data in time, filter the data for noise and outliers, compact or summarize the data (e.g., giving average values at set intervals), apply filters to the data, or perform any other computational operation on the sensor data prior to sharing the sensor data with a downstream processing system.

Minicomputer 164 may be any sort of compact computing device, such as a microcontroller, RASBERRY PI®, ARDUINO®, application-specific integrated circuit (ASIC) or the like. In other implementations, a different sort of processing device may be used in lieu of minicomputer 164.

FIG. 1B depicts one example implementation of a seat block with seats comprising integrated sensors, but other examples are possible. For example, seats 152A-C may not include AV equipment, minicomputer 164 may not be necessary, additional power or data buses may be present, etc.

Example Mapping of Seat Sensors to Seat Faults

FIG. 2 depicts an example of mapping of specific sensors 200 to specific fault modes 220. In this example, the specific fault modes 220 are associated with specific components of a seat, such as those described above with respect to FIG. 1A.

The mapping of specific sensors 200 to specific fault modes 220 is a form of feature selection for models that may be configured to detect current faults of a seat component as well as models that may be configured to predict future faults. Mapping specific sensor data to specific fault modes improves models by focusing the models on relevant data and ignoring the "noise" from sensors that are not predictive of certain modes of fault.

For example, backrest fault 202 may be detected (i.e., as a present condition) and/or predicted (i.e., as a future condition) based on data from an armrest recline button sensor 203, a backrest strain sensor 211, and a seat joint angle sensor 219. For example, repeated strain on a backrest (e.g., backrest 107 in FIG. 1A) while the seat joint angle is not changing and the armrest recline button is depressed may identify a situation in which a passenger is attempting to over-recline the seat. A certain number of occurrences of this pattern and/or certain severities of the observed data may be predictive of an earlier fault of the backrest.

As another example, a seat joint fault 204 may be detected and/or predicted based on backrest accelerometer 213 data, seat joint angle sensor 219 data, and seat joint torque sensor 221 data. For example, a faulty seat joint may be indicated by data showing a seat joint that is changing in angle despite minimal torque being applied to it (e.g., only static torque of a passenger sitting in the seat) and minimal acceleration being applied to it. In another example (not depicted), a seat joint fault may be indicated by a changing backrest angle without the armrest recline button sensor 203 indicating a depressed recline button.

As another example, a seat cushion fault 206 may be detected and/or predicted based on data from a seat cushion force sensor 207 and seat cushion accelerometer 209. For example, the forces and accelerations applied to the seat cushion over time by passengers may be used to predict when a seat cushion is or will be worn out.

As another example, a recline button fault 208 may be detected and/or predicted based on data from armrest recline button sensor 203, seat joint angle sensor 219, and seat joint torque sensor 221. For example, if the seat angle is changing without the armrest recline button being depressed, the button may have faulted in a depressed position. As another example, if the button is depressed and there is a significant torque on the seat joint angle without the seat angle changing, then the armrest recline button may be faulty.

As another example, an armrest fault 210 may be detected and/or predicted based on data from an armrest strain sensor 201 and armrest angle sensor 205. For example, significant armrest strain coupled with an unexpected angle of the armrest may indicate a faulty armrest.

As another example, a tray table fault 212 may be detected and/or predicted based on data from a tray table angle sensor 215 and a tray table torque sensor 217. For example, if significant torque is being applied to the tray table, but the angle sensor suggest the tray table is not moving between the stowed and deployed positions (or vice versa), then the tray table mechanism may be faulty.

The table depicted in FIG. 2 mapping faults modes 220 to data from specific sensors 200 is just one example, and many others are possible. For example, different combinations of data from sensors 200 may be used to predict fault modes 220 as well as other fault modes. FIG. 2 is not meant to be an exhaustive listing.

Example Seat Condition System

Figure 3:
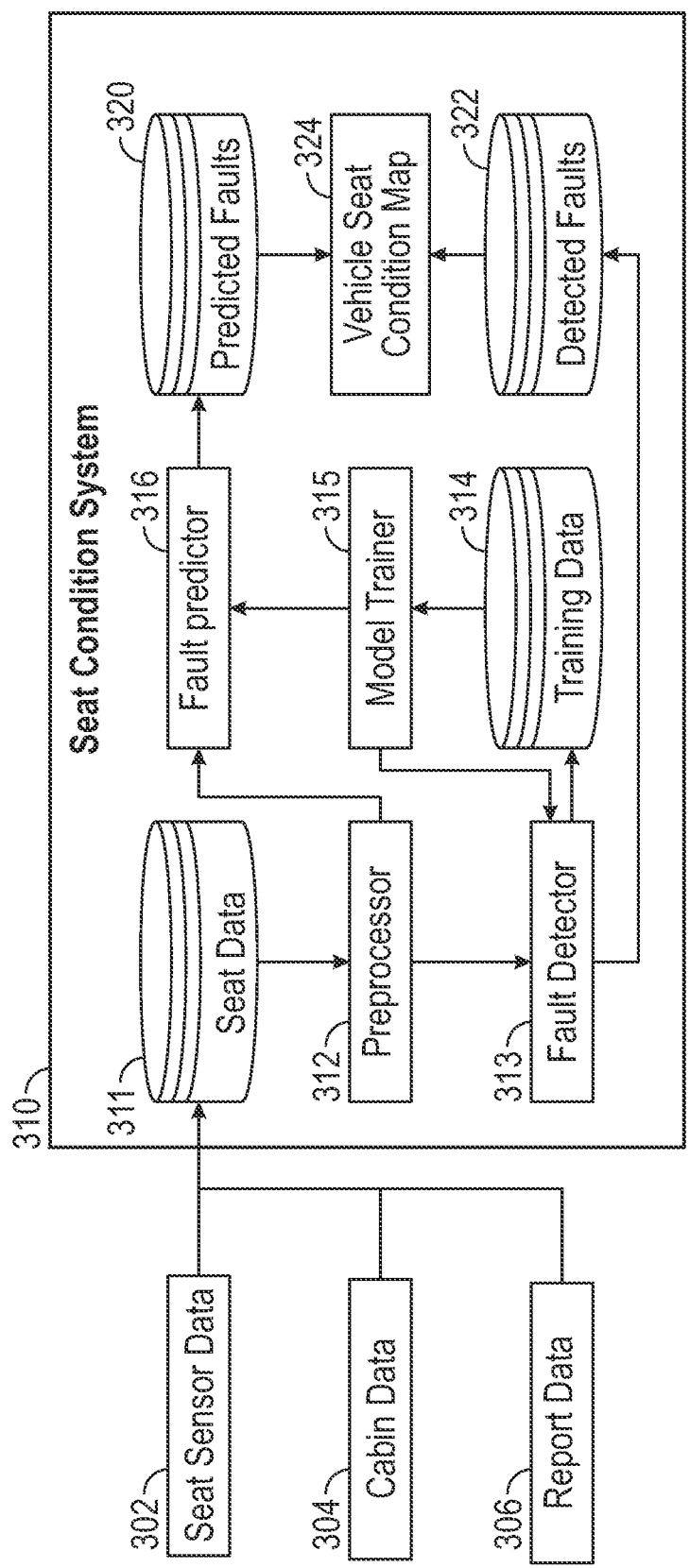
FIG. 3 depicts an example a seat condition system.

FIG. 3 depicts an example seat condition system 310.

Seat condition system 310 includes a seat data repository 311 in which seat sensor data 302, cabin data 304, report data 306, and/or other data related to seats is stored.

Seat sensor data 302 may be, for example, data from seat sensors such as discussed above with respect to FIG. 11 and FIG. 2.

Cabin data 304 may be, for example, data collected from other passenger cabin systems regarding ambient conditions, such as temperature and humidity. For example, certain aircraft may include cabin data systems that have one or more ambient condition sensors.

Report data 306 may be, for example, manual reports of seat conditions, such as signs of wear or faults identified through manual inspection. For example, aircraft cabin crew may inspect seats while a cabin is being cleaned between flights and any conditions may be noted and entered into a cabin maintenance system or some other ancillary system that shares data with seat condition system 310.

Though not shown in FIG. 3, in some implementations, seat data repository 311 may include additional sources of seat data, such as data provided by vehicle maintenance systems (e.g., relating to when seats and their various components were installed, service life, serial numbers, etc.) and by a seat (or seat component manufacturer) (e.g., expected service life, replacement or repair information, etc.).

Notably, seat condition system 310 need not have access to every type of data discussed in this example. For example, seat condition system 310 may not have access to cabin data 304 and/or report data 306 in other implementations. Similarly, seat condition system 310 may have access to additional types of data not discussed in this example. Generally, any type of data that is exploitable by a model to detect and predict seat faults may be usable by seat condition system 310.

Seat condition system 310 includes preprocessor 312, which may perform various functions on seat data within seat data repository (e.g., a database) 311 prior to the seat data being used to detect and predict faults. For example, preprocessor 312 may time-align various streams of sensor data so that they may be used as model inputs. This is because in some cases, the concurrence of events in data streams may be indicative of faults, while the individual events are not (or are not as strongly) indicative of faults. Thus, proper time alignment of various sensor data streams may be improve model performance.

Preprocessor 312 may also "clean" seat data within seat data repository 311 by detecting and correcting (or removing) corrupt or inaccurate records from a seat data set as well as by identifying incomplete, incorrect, inaccurate or irrelevant parts of the data, and then replacing, modifying, or deleting the dirty or coarse data.

Preprocessor 312 may also perform other steps, such as data normalization and formatting to prepare it for use by other aspects of seat condition system 310, such as by fault detector 313 and fault predictor 316.

Figure 4:
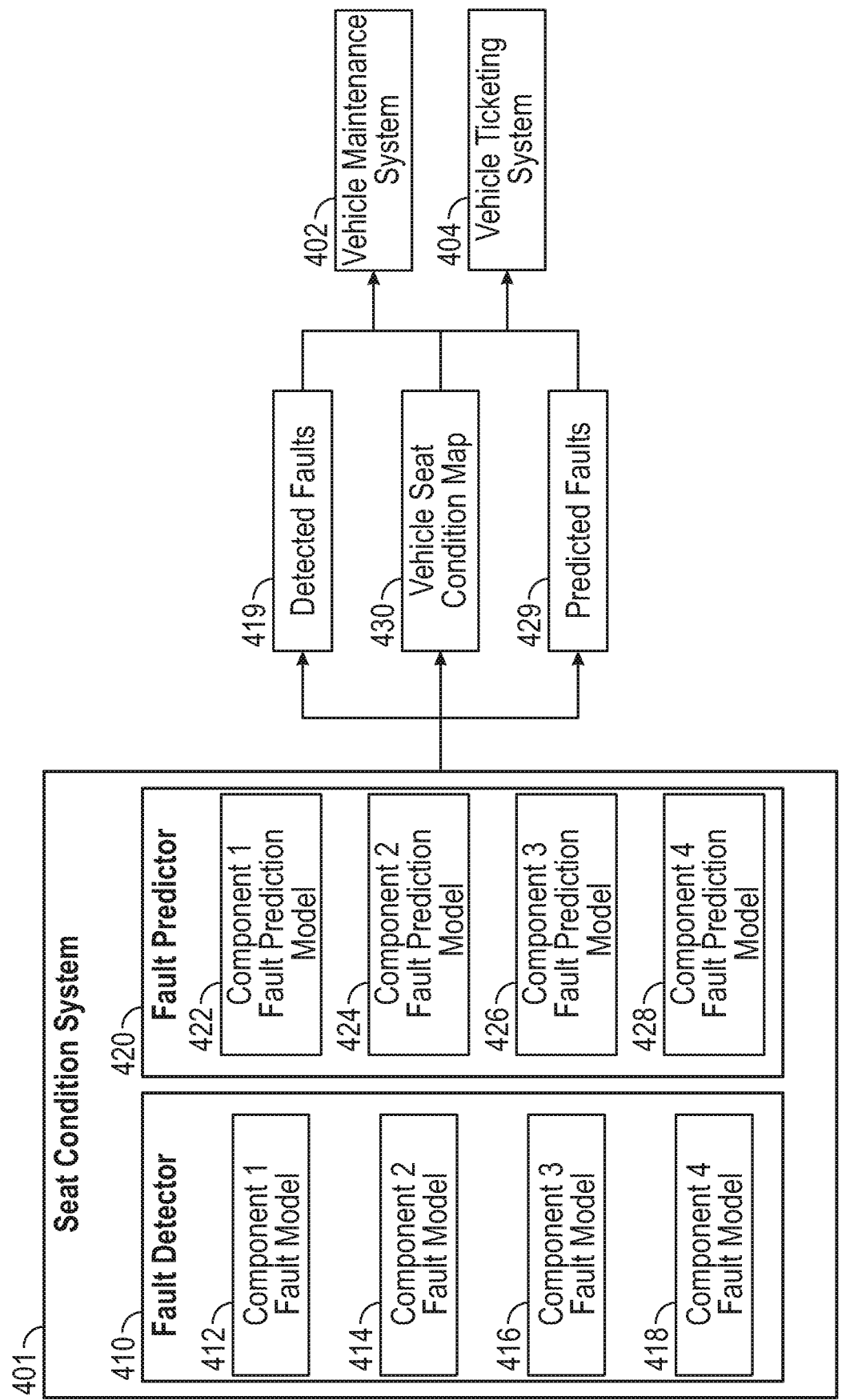
FIG. 4 depicts example applications for a seat condition system.

In the depicted example, fault detector 313 uses preprocessed seat data to detect if any seats have existing component faults. In some examples, as discussed above with respect to FIG. 2, fault detector 313 may use specific types of sensor data for detecting specific types of fault modes, such as faults of specific components of a seat. Thus, fault detector 313 may comprise a plurality of fault detection models (as depicted in FIG. 4), each trained or tuned or otherwise designed to detect a specific type or mode of fault based on a specific set of seat sensor data.

In some implementations, fault detector 313 may include machine learning models trained by model trainer 315. In other implementations, fault detector 313 may instead be rules-based, such as based on an expert system.

Fault detector 313 may provide seat fault data to detected seat fault repository 322, including: data identifying the aircraft in which the seat is installed; the component of the seat that has been determined to be faulty; time and date of the determined seat fault; types of seat sensors and data used to determine the fault; aspects regarding the model used to determine the fault (e.g., model coefficients), confidence or probability of the determined fault, and others. Seat fault data stored in detected seat fault repository 322 may then be shared with ancillary systems, such as described below with respect to FIG. 4. In some implementations, detected seat fault data may be provided directly to ancillary systems in addition to, or as an alternative to, detected seat fault data repository 322.

Detected seat fault data regarding individual seats may be combined into, for example, a vehicle seat condition map 324. An example of a vehicle (aircraft) seat condition map will be described in more detail below with respect to FIG. 5. Detected seat fault data and vehicle seat condition map 324 may be used to enable enhanced usage and maintenance schemes for commercial vehicle seats, such as described below with respect to FIG. 4.

Detected faults of seat components (e.g., detected by fault detector 313) may also be stored with the associated seat data used to predict the fault in training data repository 314. In some cases, reported faults (e.g., based on report data 306) may be associated with seat data and also stored in training data repository 314 without first passing through fault detector 313 because in such cases the fault was detected manually.

Training data repository 314 may comprise seat data, including seat sensor data, as well as a label associated with a specific fault type or mode, such as a fault of a specific seat component. Model trainer 315 may then use training data 314 to train models for detection of faults by fault detector 313 as well as models for prediction of faults by fault predictor 316. In this example, a predicted fault is a fault that has not yet occurred in a given seat component, whereas a detected or determined fault is a fault that has already occurred in a seat component.

Model trainer 315 may generate a wide variety of model types for detecting and predicting seat faults using, for example, machine learning techniques. Generally, machine learning algorithms are described as learning a target function ($f$) that best maps input variables (X) to an output variable (Y): $Y=f(X)$. For example, machine learning may be used in this context to train a model for predicting a specific seat component fault (Y) given seat sensor data (X).

Examples of machine learning algorithms that may be used to generate fault detector 313 models and fault predictor 316 models include: linear regression; logistic regression; linear discriminant analysis; classification and regression trees; naïve Bayes; K-nearest neighbors; learning vector quantization and neural networks; support vector machines; bagging and random forest; and boosting, to name a few. For example, classification-type models may be used to classify a fault based on seat data, while regression-type algorithms may predict the likelihood of a fault based on seat data, the amount of time until a seat fault, or the like.

As with fault detector 313, fault predictor 316 may comprise a plurality of fault prediction models (as depicted in FIG. 4), each trained or tuned or otherwise designed to predict a specific type or mode of fault, such as a fault of a specific component of a seat (as described above with respect to FIG. 2). Fault predictor 316 may receive preprocessed seat data from preprocessor 312 in order to predict seat component faults, which may be stored in predicted faults repository 320.

Predicted seat fault data may include, for example: data identifying the aircraft in which the seat is installed; the component of the seat that has been predicted to experience a fault; time until the predicted fault; types of seat sensors and data used to predict the fault; aspects regarding the model used to predict the fault (e.g., model coefficients), probability of the predicted fault, confidence of the fault prediction, and others.

In FIG. 3, seat condition system 310 is depicted with certain inputs (e.g., seat sensor data 302, cabin data 304, and report data 306) and with certain outputs (e.g., predicted seat faults (e.g., stored in repository 320), detected seat faults (e.g., stored in detected seat faults repository 322), and vehicle seat condition map 324).

In some implementations, the various inputs may be collected on systems external to seat condition system 310, such as by processing systems on a commercial vehicle (e.g., an aircraft). The input data may then be transmitted to seat condition system 310 while the commercial vehicle has access to a suitable data connection. For example, an aircraft may collect seat sensor data 302 and cabin data 304 during a flight and transmit or otherwise share the collected data with a remote seat condition system 310 via a wired or wireless data connection at an airport (e.g., via the Internet or another network). Similarly a bus or other commercial vehicle may collect data while in transit and transmit it to a remote seat condition system 310 while not in service.

In some implementations, aspects of seat condition system 310 may also be located on different systems. For example, while models, such as fault detection and fault prediction models (e.g., 313 and 316) may be trained and validated on one system, the models themselves may then be exported to other systems for use. Exported models may be used in other systems that can use seat condition data, such as described with respect to FIG. 4, as well in vehicle-based systems.

In some implementations, aspects of seat condition system 310 for both data storage (e.g., seat data repository 311 and training data repository 314) and data processing (e.g., preprocessor 312 and model trainer 315) may be cloud-based.

While FIG. 3 depicts one example arrangement of aspects of seat condition system 310, the various aspects may be distributed among one or more electronic processing systems in other implementations.

Example Applications for a Seat Condition System

FIG. 4 depicts example applications for seat condition system 401.

Seat condition system 401 is depicted with fault detector 410 and fault predictor 420, which may be as described with respect to fault detector 313 and fault predictor 316, respectively, in FIG. 3. Though seat condition system 401 is not depicted with the other aspects of seat condition system 310 in FIG. 3, those aspects may likewise be included in seat condition system 401. Here, they are omitted for simplicity.

In this example, fault detector 410 includes specific seat component fault detection models 412, 414, 416, and 418. Each of these seat component fault detection models may be based on different data inputs, such as different seat sensor data (e.g., as described with respect to FIGS. 2 and 3), and may output, for example, component-specific seat fault data, as described above.

Similarly, fault predictor 420 includes specific seat component fault prediction models 422, 424, 426, and 428. Each of these seat component fault prediction models may likewise be based on different data inputs, such as different sensor data (e.g., as described with respect to FIGS. 2 and 3), and may output, for example, component-specific seat prediction data, as described above.

The outputs of seat condition system 401 may be used by other processing systems to enhance vehicle maintenance and usage. For example, detected faults 419 and/or vehicle seat condition map 430 may be used by vehicle maintenance system 402 for ordering seat components, scheduling repairs or replacements of seats, and the like. Further, predicted faults 429 may be used by vehicle maintenance system 402 to reduce vehicle downtime by pre-ordering replacement or maintenance components so that they can be staged and ready in advance of a predicted component fault. For example, replacement components or even entire replacement seats may be obtained and staged at a facility near where the vehicle regularly operates so that a seat may be proactively repaired, serviced, or replaced without any unnecessary downtime.

Vehicle ticketing system 404 may also use the output of seat condition system 401 to improve management of existing seats in a vehicle. For example, based on vehicle seat condition map 430, a ticketing system may prioritize ticketing seats that are in relatively better condition to avoid negative experiences by passengers, and may avoid ticketing seats with detected faults or even predicted faults within a relevant timeframe. This further helps to balance the wear on vehicle seats so that seat component service lifetime is maximized. Balancing the wear of seat components may be particularly important where a vehicle uses seat blocks, such as described above with respect to FIG. 1B, since a single seat fault may require replacing an entire seat block.

Example Graphical User Interface Using Seat Condition Data

Figure 5:
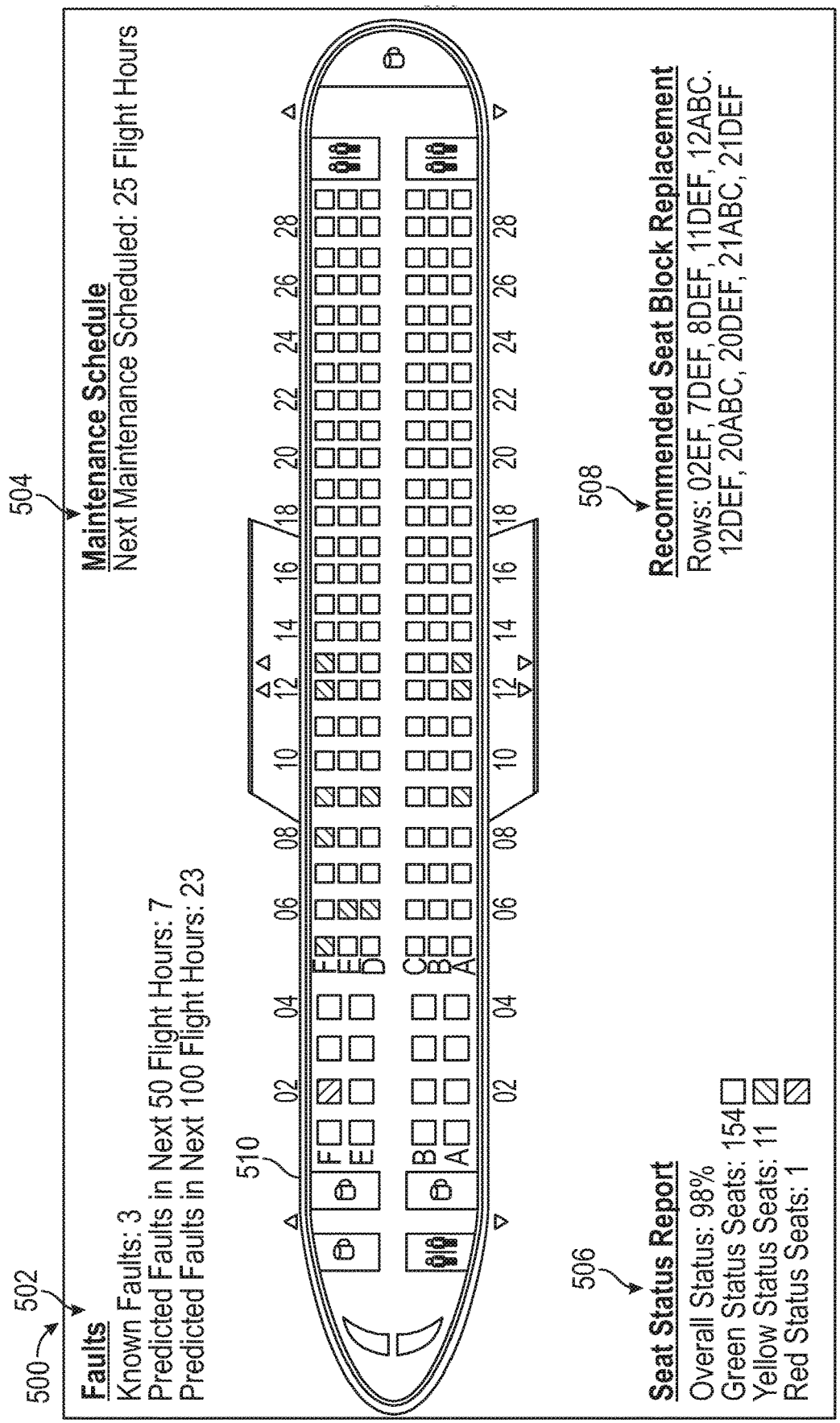
FIG. 5 depicts an example graphical user interface representing output from a seat condition system.

FIG. 5 depicts an example graphical user interface 500 representing output from a seat condition system, such as seat condition system 310 discussed above with respect to FIG. 3. For example, graphical user interface 500 could be a part of a vehicle maintenance system (e.g., 402 in FIG. 4) and/or a vehicle ticketing system (e.g., 404 in FIG. 4). In this example, the commercial travel vehicle is an aircraft, though in other examples, other commercial travel vehicles such as those discussed above may be used.

Seat condition map 510 depicts all of the seats in the depicted commercial travel vehicle and includes annotations to seats (e.g., colors) where there are detected or predicted seat component faults.

Graphical user interface 500 includes a fault information element 502, which lists information regarding both detected faults as well as predicted faults (e.g., as described above with respect to FIGS. 3 and 4). In this example, two different predicted faults counts are indicated based on two different prediction time horizons, which in this example are two different numbers of flight hours. Note that the depicted time horizons are just examples, and any suitable prediction time horizon may be used. For example, for a land-based commercial travel vehicle, miles traveled may be used instead of flight hours. In some cases, instead of time-based prediction intervals, the prediction intervals may instead be based on cycle count, such as flights or trips completed, or the like.

Graphical user interface 500 also includes a maintenance schedule element 504, which in this example indicates the next scheduled maintenance for the commercial travel vehicle.

Graphical user interface 500 also includes a seat status report element 506, which lists various status information regarding the seats in the depicted commercial travel vehicle. In this example, the seat status report includes an overall status score of 98%, which may be calculated based on the number of detected faults in the vehicle's seats. In some implementations, the overall status score may also be based on a number of predicted faults for a specific prediction time horizon.

Seat status report element 506 also includes a plurality of different seat status category counts. In this example, there is a "green" status category, which may indicate that the seat in question has no detected faults and no predicted faults within a certain prediction horizon.

There is also a "yellow" status category, which may indicate that the seat in question has no detected faults, but has a number of predicted faults within a certain prediction horizon. For example, seat 08F is indicated as having a "yellow" status in seat condition map 510. In some cases, the number of predicted faults may be compared to a threshold to determine inclusion in this category.

Finally, there is a "red" status category, which may indicate that the seat in question has a detected fault or is beyond a threshold number of predicted faults in a certain prediction horizon. For example, seat 02F is indicated as having a red status in seat condition map 510.

Note that while different color statuses are used in this example, any other categorization scheme may be equally effective. For example, statuses such as "good", "needs maintenance", and "needs replacement" maybe used as an alternative. Many other alternatives exist.

Graphical user interface 500 also includes a maintenance recommendation element 508, which recommends seat blocks for repair, service, or replacement. In this example, any seat blocks including "yellow" or "red" seats are recommended for replacement. However, in other examples, alternative rules may be used for recommending replacements.

Note that FIG. 5 is just one example of a graphical user interface using information from a seat condition system, and many other designs are possible, which may include more or fewer user interface elements, as well as other arrangements of user interface elements.

Example Methods for Detecting and Predicting Seat Component Faults

Figure 6:
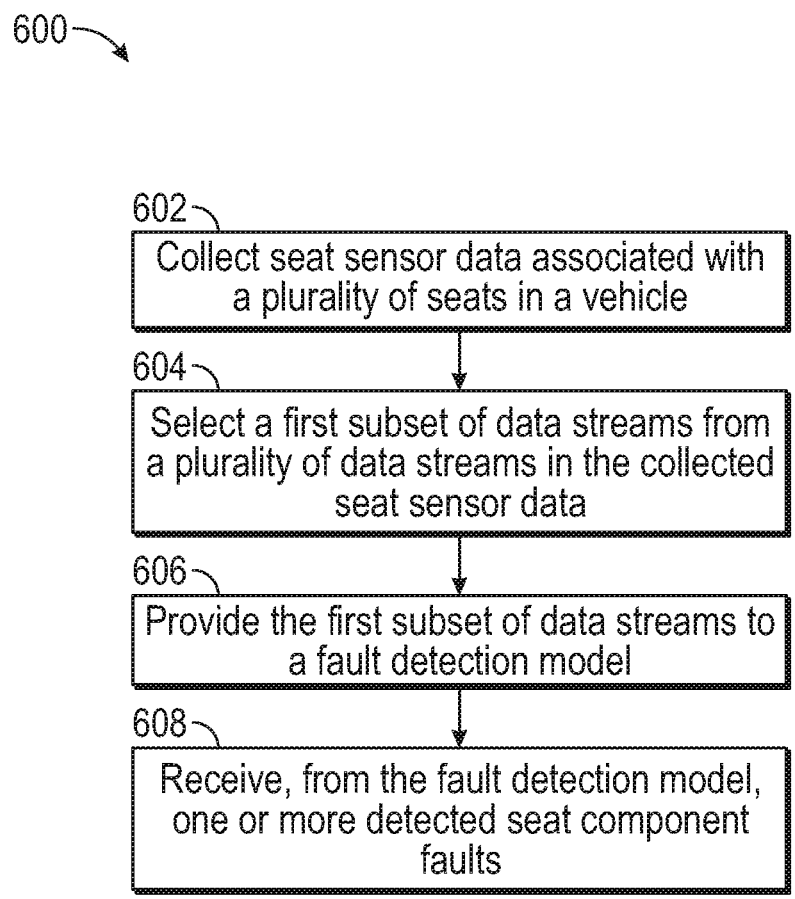
FIG. 6 depicts an example method for detecting seat component faults.

FIG. 6 depicts an example method 600 for detecting seat component faults.

Method 600 begins at step 602 with collecting seat sensor data associated with a plurality of seats in a vehicle. In some implementations, each seat sensor datum in the seat sensor data is associated with an individual seat of the plurality of seats, and an individual sensor associated with the individual seat (e.g., as described above with respect to FIGS. 1A and 1B).

Method 600 then proceeds to step 604 with selecting a first subset of data from the collected seat sensor data. In some implementations, the first subset of data comprises a plurality of data streams and each data stream of the plurality of data streams is associated with a different type of seat sensor (e.g., as described above with respect to FIGS. 1A, 1B, and 2). For example, one data stream may be associated with an armrest strain sensor and another data stream may be associated with an armrest recline button.

Method 600 then proceeds to step 606 with providing the first subset of data streams to a fault detection model (e.g., as described above with respect to FIG. 3). In some implementations, the fault detection model may be selected from a plurality of fault detection models based on the type of component fault being detected, the type of sensor data available, etc.

Method 600 then proceeds to step 608 with receiving, from the fault detection model, one or more detected seat component faults. In some implementations, the one or more detected seat component faults is associated with an individual seat of the plurality of seats in the vehicle (e.g., as described above with respect to FIGS. 3 and 4).

Though not depicted in FIG. 6, in some implementations, method 600 further includes storing in a training data repository the one or more detected seat component faults and a subset of the collected seat sensor data associated with the one or more detected seat component faults (e.g., as described above with respect to FIG. 3).

In some implementations, method 600 may further include training, based on the one or more detected seat component faults and the subset of the collected seat sensor data associated with the one or more detected seat component faults, a fault prediction model (e.g., as described above with respect to FIG. 3).

In some implementations, method 600 may further include selecting a second subset of data from the collected seat sensor data. In some implementations, the second subset of data comprises a plurality of data streams, wherein each data stream of the plurality of data streams is associated with a different type of seat sensor (e.g., as described above with respect to FIGS. 1A, 1B, and 2).

In some implementations, method 600 may further include providing the second subset of data to the fault prediction model. In some implementations, the second subset of data excludes the collected seat sensor data associated with the one or more detected seat component faults. In other words, the data used to train the fault prediction model may be excluded from the data provided to the fault prediction model to predict new faults.

In some implementations, method 600 may further include receiving, from the fault prediction model, one or more predicted seat component faults. In some implementations, each of the one or more predicted seat component faults is associated with an individual seat of the plurality of seats in the vehicle.

In some implementations, method 600 may further include aligning in time a plurality of data streams in the first subset of data prior to providing the first subset of data to the fault detection model. (e.g., as described above with respect to FIG. 3). This may ensure that each observation considered by the fault detection model includes time-aligned sensor data. In some implementations, each data stream of the plurality of data streams is associated with a different type of seat sensor.

In some implementations, method 600 may further include generating, based on the one or more detected seat component faults, a seat condition map associated with the vehicle, wherein the seat condition map comprises a seat condition indication for each seat of the plurality of seats in the vehicle (e.g., as described above with respect to FIGS. 3-5). In some cases, all seats may receive a default indication (e.g., "good" or "green") until a fault is detected for that seat.

In some implementations, method 600 may further include displaying in a graphical user interface on an electronic device the seat condition map and one or more user interface elements related to the detected seat component faults (e.g., as depicted and described with respect to FIG. 5).

In some implementations, method 600 may further include providing the seat condition map to a vehicle maintenance system (e.g., as depicted and described with respect to FIG. 4).

In some implementations, method 600 may further include providing the seat condition map to a vehicle ticketing system (e.g., as depicted and described with respect to FIG. 4).

In some implementations, method 600 may further include generating an alert based on the one or more detected seat component faults. In one example, the alert may then be sent to, for example, a vehicle maintenance system and be configured to cause the vehicle maintenance system to schedule maintenance of the vehicle. In another example, the alert may be sent to a vehicle ticketing system and configured to cause the vehicle ticketing system to avoid booking the any seat associated with the one or more detected seat component faults.

Figure 7:
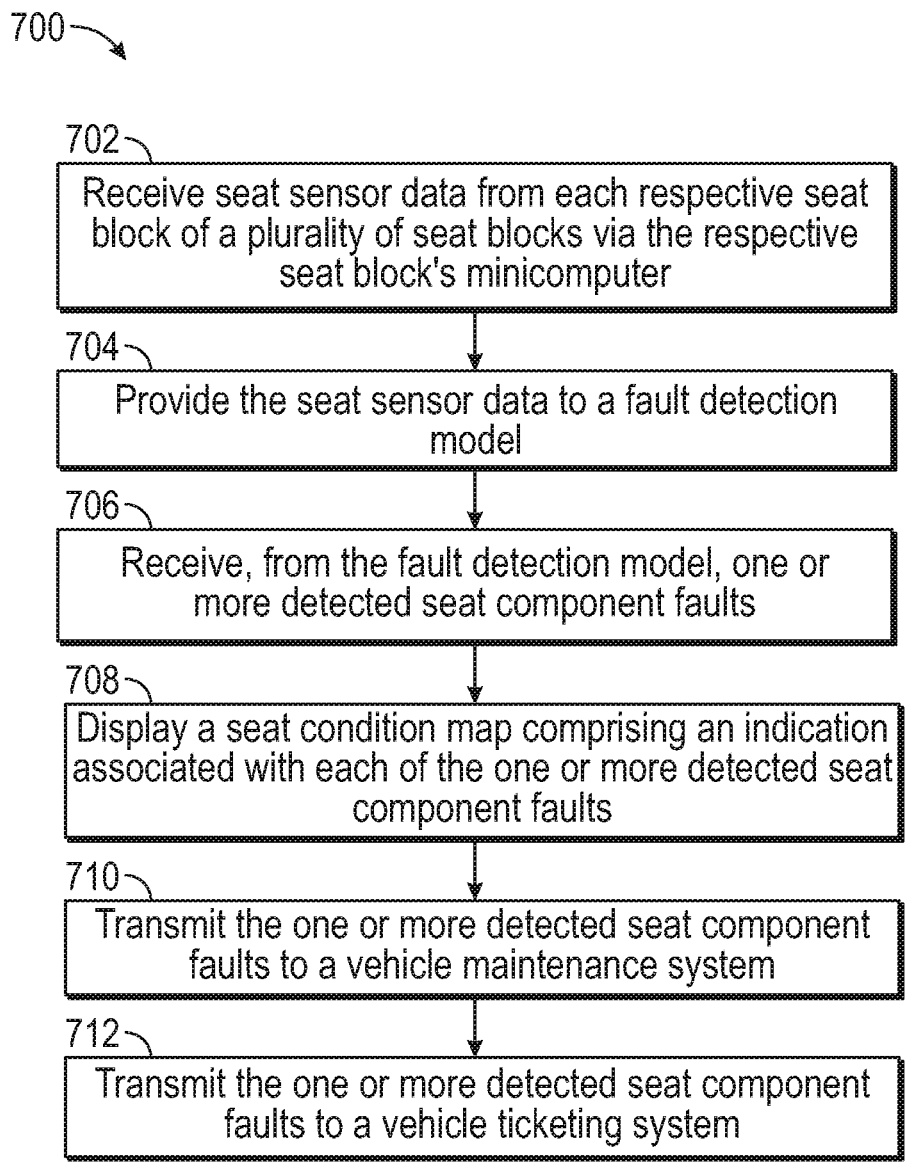
FIG. 7 depicts another example method for detecting seat component faults.

FIG. 7 depicts another example method 700 for detecting seat component faults.

Method 700 begins at step 702 with receiving seat sensor data from each respective seat block of a plurality of seat blocks via the respective seat block's minicomputer (e.g., as depicted and described above with respect to FIG. 1B).

Method 700 then proceeds to step 704 with providing the seat sensor data to a fault detection model (e.g., as depicted and described above with respect to FIG. 3).

Method 700 then proceeds to step 706 with receiving, from the fault detection model, one or more detected seat component faults (e.g., as depicted and described above with respect to FIGS. 3 and 4).

Method 700 then proceeds to step 708 with displaying a seat condition map comprising an indication associated with each of the one or more detected seat component faults (e.g., as depicted and described above with respect to FIG. 5). In some implementations, the seat condition map is displayed on a cabin information system with a vehicle, such as an aircraft, watercraft, bus, or train.

Method 700 then proceeds to step 710 with transmitting the one or more detected seat component faults to a vehicle maintenance system (e.g., as depicted and described above with respect to FIG. 4).

Method 700 then proceeds to step 712 with transmitting the one or more detected seat component faults to a vehicle ticketing system (e.g., as depicted and described above with respect to FIG. 4).

Example Methods of Using Seat Fault Detections and Predictions

Figure 8A:
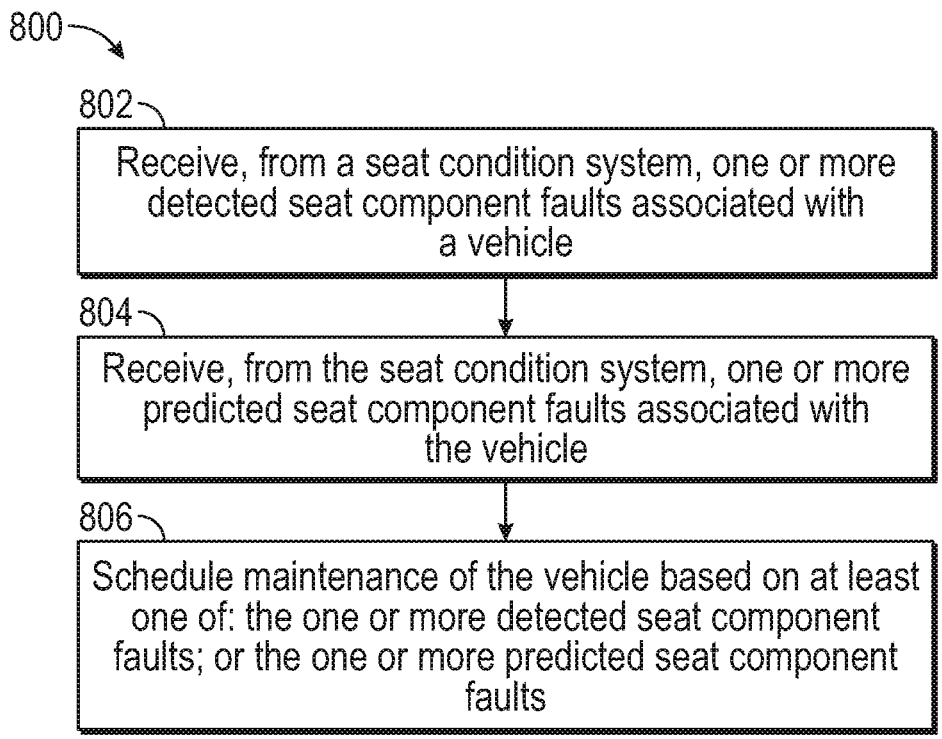
FIG. 8A depicts an example method 800 for using seat component fault data.

FIG. 8A depicts an example method 800 for using seat component fault data.

Method 800 begins at step 802 with receiving, from a seat condition system, one or more detected seat component faults associated with a vehicle.

In some implementations, the one or more detected seat component faults, or information regarding the one or more detected seat component faults may be received in an alert, such as an electronic message. The alert may comprise data regarding one or more of: information identifying the vehicle (e.g., a vehicle identifier), information identifying the seat or seats associated with the one or more detected seat component faults (including, for example: a seat identifier, a seat block identifier, a row identifier, etc.), information identifying the component (e.g., a component identifier), and others.

In some implementations, the seat condition system may be installed in a vehicle, whereas in others, the seat condition system is remote from the vehicle and receives data via a data connection (e.g., as described above with respect to FIGS. 3 and 4).

Method 800 then proceeds to step 804 with receiving, from the seat condition system, one or more predicted seat component faults associated with the vehicle (e.g., as described above with respect to FIGS. 3 and 4).

As with step 802, the one or more predicted seat component faults, or information regarding the one or more predicted seat component faults may be received in an alert, such as an electronic message. In some implementations, a single alert may comprise information regarding the one or more predicted seat component faults as well as the one or more detected seat component faults from step 802.

In some implementations, the one or more detected seat component faults and the one or more predicted seat component faults are received by a vehicle maintenance system (e.g., as described above with respect to FIG. 4).

Method 800 then proceeds to step 806 with scheduling maintenance of the vehicle based on at least one of the one or more detected seat component faults or the one or more predicted seat component faults. For example, in some cases there may be only detected seat component faults or predicted seat component faults, but not both, while in other cases there may be both.

In some implementations, the maintenance may be scheduled based on the type of component fault, such as whether or not the component is critical to the use of the seat. Further, as described above, in some implementations replacement components or maintenance components may be ordered and staged based on predicted seat component faults.

Note that while FIG. 8A depicts an example of receiving both detected seat component faults and predicted seat component faults, data regarding either a detected seat component fault or a predicted seat component fault may prompt the scheduling of maintenance of the vehicle (e.g., of an aircraft containing one or more seats associated with detected or predicted seat component faults).

Figure 8B:
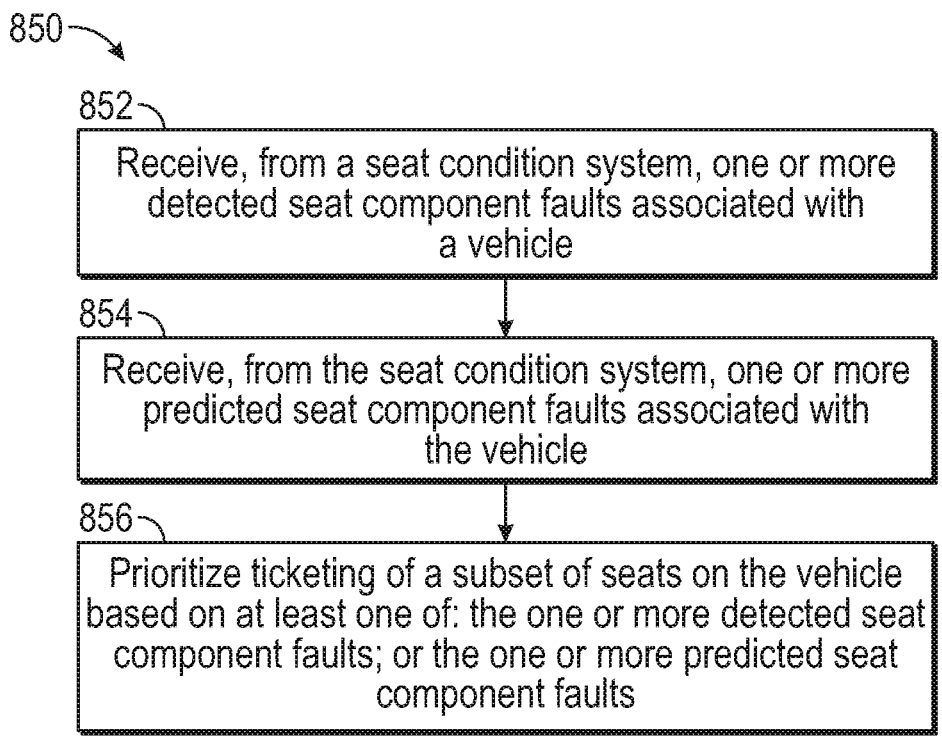
FIG. 8B depicts another example method 850 for using seat component fault data.

As above, the data regarding either the detected seat component fault or the predicted seat component fault may be contained within an alert generated by a seat condition system and transmitted to, for example, a vehicle maintenance system (as in FIG. 8A) or a vehicle ticketing system (as in FIG. 8B). The alert may comprise an identification of the vehicle and the seat (or seats) associated with the detected or predicted fault(s), as well as the particular component(s) associated with the detected or predicted fault(s).

So, for example, a similar method to that depicted in FIG. 8A may include receiving, from a seat condition system, an alert comprising an indication of at least one of: a detected seat component fault associated with a seat in a vehicle; or a predicted seat component fault associated with the seat in the vehicle; and scheduling maintenance of the vehicle based on the alert. As above, the alert may be based on data from one or more seat sensors in the seat in the vehicle which are exposed to a model of the seat condition system. FIG. 8B depicts another example method 850 for using seat component fault data.

Method 850 begins at step 852 with receiving, from a seat condition system, one or more detected seat component faults associated with a vehicle.

As above, the one or more detected seat component faults, or information regarding the one or more detected seat component faults may be received in an alert, such as an electronic message.

In some implementations, the seat condition system may be installed in a vehicle, whereas in others, the seat condition system is remote from the vehicle and receives data via a data connection (e.g., as described above with respect to FIGS. 3 and 4).

Method 850 then proceeds to step 854 with receiving, from the seat condition system, one or more predicted seat component faults associated with the vehicle (e.g., as described above with respect to FIGS. 3 and 4).

As with step 852, the one or more predicted seat component faults, or information regarding the one or more predicted seat component faults may be received in an alert, such as an electronic message. In some implementations, a single alert may comprise information regarding the one or more predicted seat component faults as well as the one or more detected seat component faults from step 852.

In some implementations, the one or more detected seat component faults and the one or more predicted seat component faults are received by a vehicle ticketing system (e.g., as described above with respect to FIG. 4).

Method 800 then proceeds to step 856 with prioritizing ticketing of a subset of seats on the vehicle based on at least one of the one or more detected seat component faults or the one or more predicted seat component faults. In some implementations, the subset of seats may include only seats with no detected faults and/or no predicted faults within a threshold period of time (e.g., enough time to cover the next travel). As above, in some cases there may be only detected seat component faults or predicted seat component faults, but not both, while in other cases there may be both.

Generally, prioritization may include selecting the seats in the vehicle without detected faults for ticketing before ticketing any seats with faults so as to balance the wear of the seats and to improve customer experience. Prioritization may also include selecting the seats in the vehicle without predicted faults during a selected time interval for ticketing before ticketing any seats with predicted faults during the selected time interval. Here again, this may balance the wear across all of the vehicles seats while avoiding negative customer experiences with seats that experience faults during use. Other prioritization strategies are possible, as are combinations of those discussed above.

Example Processing System

Figure 9:
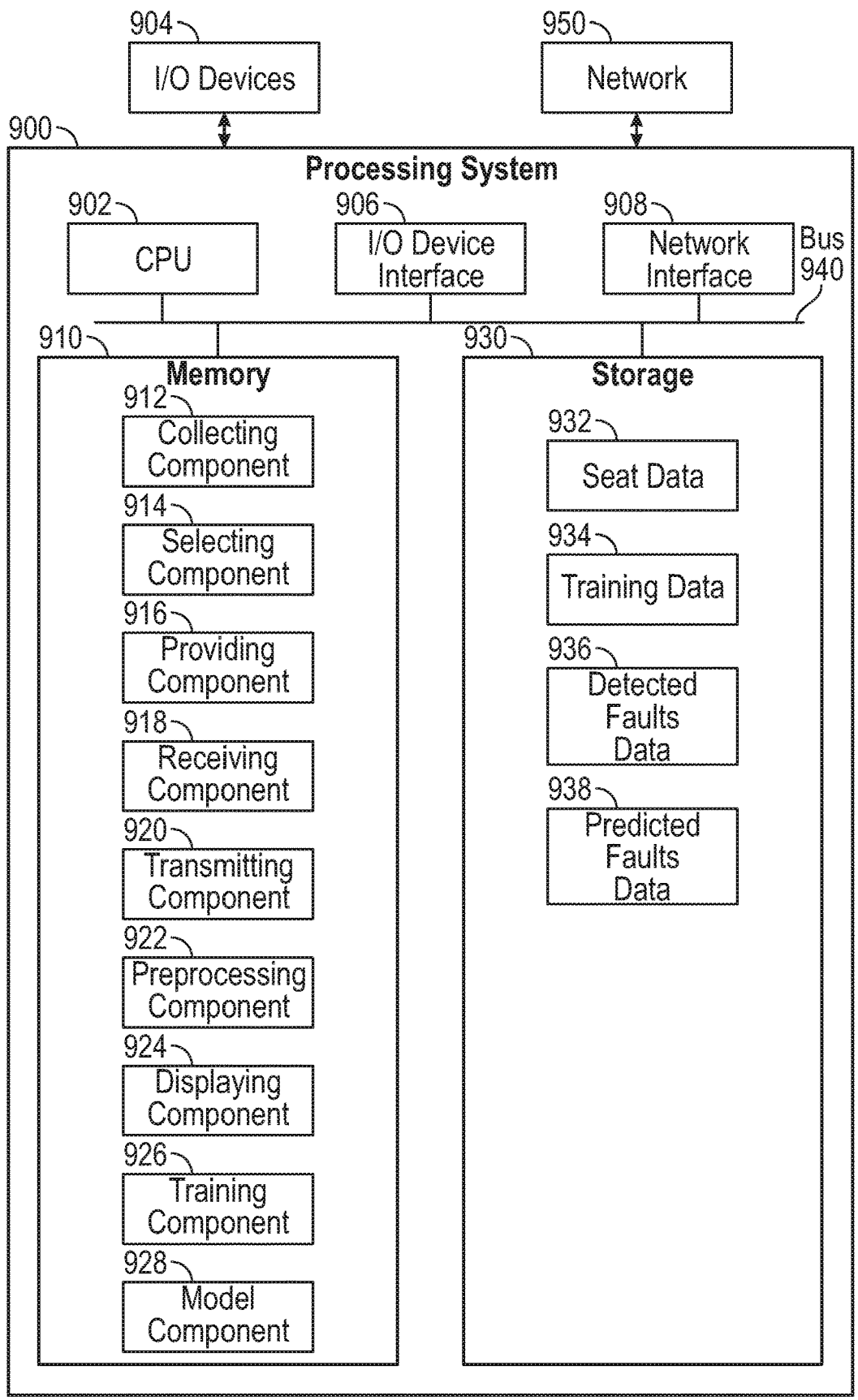
FIG. 9 depicts an example processing system 900.

FIG. 9 depicts an example processing system 900. For example, processing system 900 may be configured to perform the methods and operations described herein.

Processing system 900 includes a CPU 902 connected to a data bus 940. CPU 902 is configured to process computer-executable instructions, e.g., stored in memory 910 or storage 930, and to cause processing system 900 to perform methods as described herein, for example with respect to FIGS. 6, 7, 8A, and 8B.

CPU 902 is included to be representative of a single CPU, multiple CPUs, a single CPU having multiple processing cores, and other forms of processing architecture capable of executing computer-executable instructions.

Processing system 900 further includes input/output device(s) 904 and input/output interface(s) 906, which allow processing system 900 to interface with input/output devices, such as, for example, keyboards, displays, mouse devices, pen input, and other devices that allow for interaction with processing system 900.

Processing system 900 further includes network interface 908, which provides processing system 900 with access to external networks, such as network 950. In some implementations, network interface 908 may include one or more of a receiver, a transmitter, or a transceiver. Network 950 may be a local area network (LAN), a wide area network (WAN), the Internet, a cellular network, a satellite communication network, and the like.

Processing system 900 further includes memory 910, which in this example includes a plurality of components.

For example, memory 910 includes collecting component 912, which is configured to perform collecting functions as described above (e.g., with respect to collecting seat sensor data in FIGS. 3, 6, 7, 8A, and 8B).

Memory 910 further includes selecting component 914, which is configured to perform selecting functions as described above (e.g., with respect to FIGS. 2, 3, 4, 6, 7, 8A, and 8B)).

Memory 910 further includes providing component 916, which is configured to perform providing functions as described above (e.g., with respect to FIGS. 3, 4, 6, 7, 8A, and 8B).

Memory 910 further includes receiving component 918, which is configured to perform receiving functions as described above (e.g., with respect to FIGS. 3, 4, 6, 7, 8A, and 8B)).

Memory 910 further includes transmitting component 920, which is configured to perform transmitting functions as described above (e.g., with respect to FIGS. 3, 4, 6, 7, 8A, and 8B).

Memory 910 further includes preprocessing component 922, which is configured to perform preprocessing functions as described above (e.g., with respect to FIGS. 3, 6, 7, 8A, and 8B).

Memory 910 further includes displaying component 924, which is configured to perform displaying functions as described above (e.g., with respect to FIGS. 3, 6, 7, 8A, and 8B).

Memory 910 further includes training component 926, which is configured to perform training functions as described above (e.g., with respect to FIGS. 3, 6, 7, 8A, and 8B).

Memory 910 further includes model component 928, which is configured to perform displaying detecting and predicting functions as described above (e.g., with respect to FIGS. 3, 6, 7, 8A, and 8B).

Note that while shown as a single memory 910 in FIG. 9 for simplicity, the various aspects stored in memory 910 may be stored in different physical memories, but all accessible CPU 902 via internal data connections, such as bus 940.

Processing system 900 further includes storage 930, which in this example includes seat data 932, which may be as described above with respect to FIGS. 1A, 1B, 2, 3, 6, 7, 8A, and 8B.

Storage 930 further includes training data 934, which may be as described above with respect to FIG. 3.

Storage 930 further includes detected faults data 936, which may be as described above with respect FIG. 3.

Storage 930 further includes predicted faults data 938, which may be as described above with respect FIG. 3.

As with memory 910, a single storage 930 is depicted in FIG. 9 for simplicity, but the various aspects stored in storage 930 may be stored in different physical storages, but all accessible to CPU 902 via internal data connections, such as bus 940, or external connection, such as network interface 908.

Notably, the various aspects of processing system 900, including the components in memory 910 and the data in storage 930 are just one example, and many others are possible consistent with the methods and systems disclosed herein.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the terms "determine" and variants thereof (e.g., "determining" or "determined") encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    collecting seat sensor data associated with a plurality of seats in a vehicle, wherein each seat sensor datum in the seat sensor data is associated with:
        an individual seat of the plurality of seats, and
        an individual sensor associated with the individual seat;
    selecting a first subset of data from the collected seat sensor data;
    aligning in time a plurality of data streams in the first subset of data, wherein each data stream of the plurality of data streams is associated with a different type of seat sensor, and wherein at least one data stream of the plurality of data streams is sampled at a different rate than another data stream in the plurality of data streams;
    providing the first subset of data to a fault detection model; and
    receiving, from the fault detection model, one or more detected seat component faults, wherein:
        each of the one or more detected seat component faults is associated with a first component of an individual seat of the plurality of seats in the vehicle,
        each of the one or more detected seat component faults is based on seat sensor data in the first subset of data from a first individual sensor and a second individual sensor, and
        the first individual sensor is integrated with the first component of the individual seat and the second individual sensor is integrated with a second component of the individual seat, different from the first component.

2. The method of claim 1, further comprising: storing in a training data repository:
    the one or more detected seat component faults; and a subset of the collected seat sensor data associated with the one or more detected seat component faults.

3. The method of claim 2, further comprising:
training, based on the one or more detected seat component faults and the subset of the collected seat sensor data associated with the one or more detected seat component faults, a fault prediction model;
selecting a second subset of data from the collected seat sensor data;
providing the second subset of data to the fault prediction model; and
receiving, from the fault prediction model, one or more predicted seat component faults, wherein each of the one or more predicted seat component faults is associated with the first component of an individual seat of the plurality of seats in the vehicle.

4. The method of claim 3, wherein the second subset of data excludes the collected seat sensor data associated with the one or more detected seat component faults.

5. The method of claim 1, further comprising:
generating, based on the one or more detected seat component faults, a seat condition map associated with the vehicle, wherein the seat condition map comprises a seat condition indication for each seat of the plurality of seats in the vehicle; and
displaying in a graphical user interface on an electronic device:
the seat condition map; and
one or more user interface elements related to the detected seat component faults.

6. The method of claim 1, further comprising: generating an alert based on the one or more detected seat component faults.

7. The method of claim 6, further comprising: providing the alert to at least one of a vehicle ticketing system or a vehicle maintenance system.

8. The method of claim 1, wherein:
the one or more detected seat component faults is further based on seat sensor data in the first subset of data from a third individual sensor;
the third individual sensor is integrated with a third component of the individual seat, different from the first and second components; and
the second and third individual sensors comprise a touch sensor integrated with the second component of the individual seat and an angle sensor integrated with the third component of the individual seat.

9. The method of claim 8, wherein the first and second individual sensors further comprise a strain sensor or a torque sensor integrated with the first and second components of the individual seat.

10. The method of claim 1, wherein the first and second individual sensors comprise an accelerometer integrated with the second component of the individual seat and an angle or torque sensor integrated with the first component of the individual seat.

11. The method of claim 1, wherein the first and second components of the individual seat comprise an armrest and a seat joint.

12. The method of claim 1, wherein the first and second components of the individual seat comprise a backrest and a seat joint.

13. An apparatus, comprising:
a memory comprising computer-executable instructions;
a processor configured to execute the computer-executable instructions and cause the apparatus to:
collect seat sensor data associated with a plurality of seats in a vehicle, wherein each seat sensor datum in the seat sensor data is associated with:
an individual seat of the plurality of seats, and
an individual sensor associated with the individual seat;
select a first subset of data from the collected seat sensor data;
align in time a plurality of data streams in the first subset of data, wherein each data stream of the plurality of data streams is associated with a different type of seat sensor, and wherein at least one data stream of the plurality of data streams is sampled at a different rate than another data stream in the plurality of data streams;
provide the first subset of data to a fault detection model; and
receive, from the fault detection model, one or more detected seat component faults, wherein:
each of the one or more detected seat component faults is associated with a first component of an individual seat of the plurality of seats in the vehicle,
each of the one or more detected seat component faults is based on seat sensor data in the first subset of data from a first individual sensor and a second individual sensor, and
the first individual sensor is integrated with the first component of the individual seat and the second individual sensor is integrated with a second component of the individual seat, different from the first component.

14. The apparatus of claim 13, wherein the processor is further configured to cause the apparatus to: store in a training data repository:
the one or more detected seat component faults; and
a subset of the collected seat sensor data associated with the one or more detected seat component faults.

15. The apparatus of claim 14, wherein the processor is further configured to cause the apparatus to:
train, based on the one or more detected seat component faults and the subset of the collected seat sensor data associated with the one or more detected seat component faults, a fault prediction model;
select a second subset of data from the collected seat sensor data;
provide the second subset of data to the fault prediction model; and
receive, from the fault prediction model, one or more predicted seat component faults, wherein each of the one or more predicted seat component faults is associated with the first component of an individual seat of the plurality of seats in the vehicle.

16. The apparatus of claim 15, wherein the second subset of data excludes the collected seat sensor data associated with the one or more detected seat component faults.

17. The apparatus of claim 13, wherein the processor is further configured to cause the apparatus to:
generate, based on the one or more detected seat component faults, a seat condition map associated with the vehicle, wherein the seat condition map comprises a seat condition indication for each seat of the plurality of seats in the vehicle; and
display in a graphical user interface:
the seat condition map; and
one or more user interface elements related to the detected seat component faults.

18. The apparatus of claim 13, wherein the processor is further configured to cause the apparatus to: generate an alert based on the one or more detected seat component faults.

19. The apparatus of claim 18, wherein the processor is further configured to cause the apparatus to: provide the alert to at least one of a vehicle ticketing system or a vehicle maintenance system.

20. A system, comprising:
a plurality of seat blocks, wherein:
each respective seat block of the plurality of seat blocks comprises a plurality of seats and a minicomputer, and
each seat of the plurality of seats in the respective seat block comprises a plurality of seat sensors in data communication with the minicomputer;
a display device;
a memory comprising computer-executable instructions;
a processor configured to execute the computer-executable instructions and cause the system to:
receive seat sensor data from each respective seat block of the plurality of seat blocks via the respective seat block's minicomputer;
align in time a plurality of data streams in the seat sensor data, wherein each data stream of the plurality of data streams is associated with a different type of seat sensor, and wherein at least one data stream of the plurality of data streams is sampled at a different rate than another data stream in the plurality of data streams;
provide the seat sensor data to a fault detection model;
receive, from the fault detection model, one or more detected seat component faults, wherein:
each of the one or more detected seat component faults is associated with a first component of a seat of the plurality of seats in the respective seat block
each of the one or more detected seat component faults is based on seat sensor data from a first seat sensor and a second seat sensor, and
the first seat sensor is integrated with the first component of the seat and the second seat sensor is integrated with a second component of the seat, different from the first component; and
display, on the display device, a seat condition map comprising an indication associated with each of the one or more detected seat component faults.

21. The system of claim 20, further comprising:
a transceiver,
wherein the processor is further configured to cause the system to: transmit, via the transceiver, the one or more detected seat component faults to at least one of:
a vehicle maintenance system; or
a vehicle ticketing system.

22. The system of claim 21, wherein the display device, memory, processor, and transceiver are part of a vehicle cabin information system.

23. The system of claim 22, wherein the plurality of seat blocks and the vehicle cabin information system are installed in an aircraft.

24. A method, comprising:
collecting seat sensor data associated with a plurality of seats in a vehicle, wherein each seat sensor datum in the seat sensor data is associated with:
an individual seat of the plurality of seats, and
an individual sensor associated with the individual seat;
aligning in time a plurality of data streams in the seat sensor data, wherein each data stream of the plurality of data streams is associated with a different type of seat sensor, and wherein at least one data stream of the plurality of data streams is sampled at a different rate than another data stream in the plurality of data streams;
providing the seat sensor data to a fault prediction model; and
receiving, from the fault prediction model, one or more predicted seat component faults, wherein:
each of the one or more predicted seat component faults is associated with a first component of an individual seat of the plurality of seats in the vehicle,
each of the one or more predicted seat component faults is based on seat sensor data from a first individual sensor and a second individual sensor, and
the first individual sensor is integrated with the first component of the individual seat and the second individual sensor is integrated with a second component of the individual seat, different from the first component.

25. The method of claim 24, further comprising:
receiving, from a training data repository, training data comprising:
one or more seat component faults; and
seat sensor data associated with the one or more seat component faults; and
training, based on the one or more seat component faults and the seat sensor data associated with the one or more seat component faults, the fault prediction model.

26. The method of claim 24, further comprising:
generating, based on the one or more predicted seat component faults, a seat condition map associated with the vehicle,
wherein the seat condition map comprises a seat condition indication for each seat of the plurality of seats in the vehicle.

27. The method of claim 24, further comprising:
generating an alert based on the one or more predicted seat component faults; and
providing the alert to at least one of a vehicle ticketing system or a vehicle maintenance system.

28. An apparatus, comprising:
a memory comprising computer-executable instructions;
a processor configured to execute the computer-executable instructions and cause the apparatus to:
collect seat sensor data associated with a plurality of seats in a vehicle, wherein each seat sensor datum in the seat sensor data is associated with:
an individual seat of the plurality of seats, and
an individual sensor associated with the individual seat;
align in time a plurality of data streams in the seat sensor data, wherein each data stream of the plurality of data streams is associated with a different type of seat sensor, and wherein at least one data stream of the plurality of data streams is sampled at a different rate than another data stream in the plurality of data streams;
provide the seat sensor data to a fault prediction model; and
receive, from the fault prediction model, one or more predicted seat component faults, wherein:

each of the one or more predicted seat component faults is associated with a first component of an individual seat of the plurality of seats in the vehicle, each of the one or more predicted seat component faults is based on seat sensor data from a first individual sensor and a second individual sensor, and the first individual sensor is integrated with the first component of the individual seat and the second individual sensor is integrated with a second component of the individual seat, different from the first component.

29. The apparatus of claim 28, wherein the processor is further configured to cause the apparatus to:

receive, from a training data repository, training data comprising:
one or more seat component faults; and
seat sensor data associated with the one or more seat component faults; and train, based on the one or more seat component faults and the seat sensor data associated with the one or more seat component faults, the fault prediction model.

30. The apparatus of claim 28, wherein the processor is further configured to cause the apparatus to:

generate, based on the one or more predicted seat component faults, a seat condition map associated with the vehicle, wherein the seat condition map comprises a seat condition indication for each seat of the plurality of seats in the vehicle.

31. The apparatus of claim 28, wherein the processor is further configured to cause the apparatus to:

generate an alert based on the one or more predicted seat component faults; and provide the alert to at least one of a vehicle ticketing system or a vehicle maintenance system.

* * * * *